(12) United States Patent
Kouda et al.

(10) Patent No.: US 9,446,630 B2
(45) Date of Patent: Sep. 20, 2016

(54) PNEUMATIC TIRE

(75) Inventors: Hiraku Kouda, Hiratsuka (JP);
Masahiro Ishida, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 5 days.

(21) Appl. No.: 13/564,314

(22) Filed: Aug. 1, 2012

(65) Prior Publication Data

US 2013/0032265 A1 Feb. 7, 2013

(30) Foreign Application Priority Data

Aug. 3, 2011 (JP) .................. 2011-170535

(51) Int. Cl.
*B60C 13/00* (2006.01)
*B60C 13/02* (2006.01)

(52) U.S. Cl.
CPC ............ *B60C 13/02* (2013.01); *B60C 13/001* (2013.04)

(58) Field of Classification Search
CPC ................. B60C 13/001; B60C 13/00–13/04
USPC ................................. 152/523–525
See application file for complete search history.

(56) References Cited

U.S. PATENT DOCUMENTS

2008/0283169 A1   11/2008   Sato et al.

FOREIGN PATENT DOCUMENTS

| JP | 02127108 | A | * | 5/1990 | ............ | B60C 13/00 |
|----|----------|---|---|--------|--------------|------------|
| JP | 06-106921 |  |  | 4/1994 | | |
| JP | 06106921 | A | * | 4/1994 | ............ | B60C 13/00 |
| JP | H07-164831 |  |  | 6/1995 | | |
| JP | 09-315111 |  |  | 12/1997 | | |
| JP | 09315111 | A | * | 12/1997 | ............ | B60C 13/00 |
| JP | 11-198614 |  |  | 7/1999 | | |
| JP | 11198614 | A | * | 7/1999 | ............ | B60C 13/00 |
| JP | 2002-522294 |  |  | 7/2002 | | |
| JP | 2007-091155 |  |  | 4/2007 | | |
| JP | 2008-273505 |  |  | 11/2008 | | |
| JP | 2010064656 | A | * | 3/2010 | ............ | B60C 13/00 |
| JP | 2010-254088 |  |  | 11/2010 | | |
| JP | 4640517 |  |  | 12/2010 | | |
| JP | 2011-105231 |  |  | 6/2011 | | |
| JP | 2011-126335 |  |  | 6/2011 | | |
| JP | 2011116306 | A | * | 6/2011 | ............ | B60C 13/00 |
| JP | 2011126335 | A | * | 6/2011 | ............ | B60C 13/00 |
| WO | WO 00/09348 |  |  | 2/2000 | | |
| WO | WO 2011/062241 |  |  | 5/2011 | | |

OTHER PUBLICATIONS

Machine Translation: JP2011-116306; Iwabuchi; (No date).*
Machine Translation: JP2010-064656; Nishikawa; (No date).*
Machine Translation: JP09-315111; Itabashi; (No date).*
Machine Translation: JP06106921; Wakabayashi; (No date).*
Machine translation: JP2011-126335; Iwabuchi, Sotaro; No date.*
Machine Translation: JP11-198614; Itabashi, Shinobu; No date.*
Japanese Decision of Patent dated Jun. 4, 2013, 1 page, Japan.
Chinese Office Action for Chinese Patent Application No. 201210272776X dated Aug. 27, 2014, 11 pages, China.

* cited by examiner

*Primary Examiner* — Michael H Wilson
*Assistant Examiner* — Kendra Ly
(74) *Attorney, Agent, or Firm* — Thorpe North & Western

(57) ABSTRACT

A pneumatic tire with a side wall portion includes a decorative region including two or more decorative portions that are continuously disposed so as to be contiguous in a tire circumferential direction and the tire radial direction, the decorative portions including multiple convex ridges that are disposed on an outer surface so as to be adjacent in the tire circumferential direction. A ridge arrangement angle is the same in the same decorative portion, and a ridge arrangement angle of the contiguous decorative portion differs therefrom. A distance between a first imaginary boundary line joining end portions of the ridges of the decorative portion that are on a side adjacent to the contiguous decorative portion and a second imaginary boundary line joining end portions of the ridges of the contiguous decorative portion on a side adjacent to the first imaginary boundary line is less than 1 mm.

17 Claims, 8 Drawing Sheets

PNEUMATIC TIRE

PRIORITY CLAIM

Priority is claimed to Japan Patent Application Serial No. 2011-170535 filed on Aug. 3, 2011.

BACKGROUND

1. Technical Field

The present technology relates to a pneumatic tire for mounting on a vehicle.

2. Related Art

Pneumatic tires for mounting on vehicles such as automobiles and the like are known that have a portion (serration) in a side wall portion of the tire where multiple ridges are formed at a short pitch, the ridges being constituted by small, linear protrusions or recesses. For example, in Japanese Patent No. 3645358, a pneumatic tire in which a circular decorative body is provided on a surface of a side wall is described, the circular decorative body being formed from multiple small ridges having a height of not more than about 2 mm, disposed at a small pitch of not more than about 5 mm in a circumferential direction. Additionally, with the pneumatic tire described in Japanese Patent No. 3645358, the circular decorative body is divided into a plurality of crescentic decorative bodies on the periphery by a narrow band-like dividing band that extends in a direction inclined at a large angle, with respect to a radial direction, of not less than 70° and less than 90°. The ridges extend substantially parallel to each other within the same crescentic decorative body, and extend in a different direction in a contiguous crescentic decorative body.

Additionally, in Japanese Unexamined Patent Application Publication No. H06-106921A, a pneumatic tire is described in which a side wall portion is divided into a plurality of fan-shaped regions in a tire circumferential direction, wherein a difference between surface roughness of contiguous fan-shaped regions is not less than 50 μm.

As with the pneumatic tire described in Japanese Patent No. 3645358, appearance flaws of a tire can be improved by forming a serration in the side wall of the tire, the serration being constituted by multiple ridges. However, with the pneumatic tire described in Japanese Patent No. 3645358, unevennesses in the side wall portion of the tire, specifically at carcass splice portions and portions where the carcass is folded up, may not be sufficiently camouflaged. Thus, there are cases where improvement of the quality of the appearance of the tire is insufficient. Additionally, in some cases, camouflaging properties are insufficient even when the surface roughness for each region divided into a plurality of sections in the circumferential direction is varied, as described in Japanese Unexamined Patent Application Publication No. H06-106921A and, thus, improvement of the quality of the appearance of the tire may be insufficient.

SUMMARY

The present technology provides a pneumatic tire by which the quality of the appearance of the tire can be enhanced while maintaining performance of the tire. The present technology includes a pneumatic tire including a tread portion, a side wall portion, and a bead portion. The side wall portion includes, in a specific region in a tire radial direction, a decorative region including two or more decorative portions that are continuously disposed so as to be contiguous in a tire circumferential direction and the tire radial direction, respectively, the decorative portions including multiple convex ridges that are disposed on an outer surface so as to be adjacent in the tire circumferential direction. A ridge arrangement angle, which is an angle formed by the ridges and a line tangent to the decorative region at an edge on an inner side in the tire radial direction, is the same in the same decorative portion, and a ridge arrangement angle of the contiguous decorative portion differs therefrom. A distance between a first imaginary boundary line joining end portions of the ridges of the decorative portion that are on a side adjacent to the contiguous decorative portion and a second imaginary boundary line joining end portions of the ridges of the contiguous decorative portion on a side adjacent to the first imaginary boundary line is less than 1 mm.

Unevennesses at carcass splice portions and portions where the carcass is folded up are more appropriately camouflaged due to the providing of the decorative region in which a plurality of decorative portions having ridge arrangements that are different from those of the contiguous decorative portions is disposed in the tire circumferential direction and the tire radial direction, respectively, in the side wall portion. Therefore, it is possible to realize a superior three-dimensional appearance of the pneumatic tire. As a result, the quality of the appearance of the tire can be enhanced while maintaining performance of the tire.

Here, the first imaginary boundary line and the second imaginary boundary line are preferably disposed periodically in the tire circumferential direction and the tire radial direction. By periodically disposing the first imaginary boundary line and the second imaginary boundary line, each of the decorative portions can be provided with a similar or substantially identical form and unevennesses in the side wall portion can be more appropriately camouflaged. Therefore, it is possible to realize a superior three-dimensional appearance of the pneumatic tire.

Additionally, the ridge arrangement angle of the decorative portion is preferably not less than 20° and not more than 160° different from the ridge arrangement angle of the contiguous decorative portion. By varying the ridge arrangement angle a certain angle or greater, unevennesses in the side wall portion can be more appropriately camouflaged and a superior three-dimensional appearance of the pneumatic tire can be realized.

Additionally, the decorative region preferably includes not less than three types and not more than twelve types of the decorative portions having different ridge arrangement angles. As a result, unevennesses at carcass splice portions and portions where the carcass is folded up can be more appropriately camouflaged and a superior three-dimensional appearance of the pneumatic tire can be realized.

Additionally, the decorative portions are preferably disposed in the decorative region in the tire circumferential direction and/or the tire radial direction in a combination where the ridge arrangement angle varies periodically. As a result, a superior three-dimensional appearance of the pneumatic tire can be realized.

Additionally, an area of a decorative portion is preferably not less than 0.3 cm$^2$ and not more than 10.0 cm$^2$. As a result, unevennesses at carcass splice portions and portions where the carcass is folded up can be more appropriately camouflaged and a superior three-dimensional appearance can be realized.

Additionally, preferably at least one of the decorative portions included in the decorative region has a ridge length per unit area different than the ridge length per unit area included in the decorative portions. As a result, unevennesses at carcass splice portions and portions where the carcass is folded up can be more appropriately camouflaged and a superior three-dimensional appearance can be realized.

Additionally, ridges of the decorative portion are preferably separated from ridges of the contiguous decorative portion. As a result, cracking can be more favorably suppressed and durability can be enhanced.

According to the pneumatic tire of the present technology, a pneumatic tire by which the quality of the appearance of the tire is enhanced while maintaining performance of the tire can be provided.

DETAILED DESCRIPTION

An embodiment of the present technology is described below in detail based on the drawings. However, the present technology is not limited to this embodiment. The constituents of the embodiment include constituents that can be easily replaced by those skilled in the art and constituents substantially same as the constituents of the embodiment. Furthermore, the multiple modified examples described in the embodiment can be combined as desired within the scope apparent to a person skilled in the art.

In the following descriptions, additionally, "tire width direction" refers to a direction parallel to a rotational axis (not illustrated) of a pneumatic tire 1, and "outer side in the tire width direction" refers to a side distanced from a tire equatorial plane (tire equator) in the tire width direction. "Tire circumferential direction" refers to a circumferential direction with the rotational axis as the center axis. Furthermore, "tire radial direction" refers to the direction orthogonal to the rotational axis; "inner side in the tire radial direction" refers to the side facing the rotational axis in the tire radial direction; and "outer side in the tire radial direction" refers to the side distanced from the rotational axis in the tire radial direction. Additionally, "tire equatorial plane" refers to a planar surface orthogonal to the rotational axis and that passes through a center of a tire width of the pneumatic tire 1. The tire width is the width in the tire width direction between constituents located to the outside in the tire width direction, or in other words, the distance between the most distant constituents from the tire equatorial plane in the tire width direction. Furthermore, "tire equator" refers to a line along the circumferential direction of the pneumatic tire 1 that lies on the tire equatorial plane.

Figure 1:
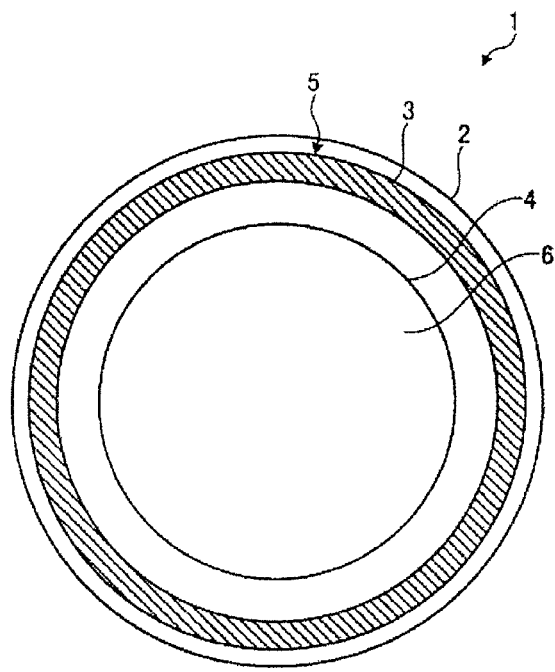
FIG. 1 is a side view of a pneumatic tire according to an embodiment of the present technology.
Figure 2:
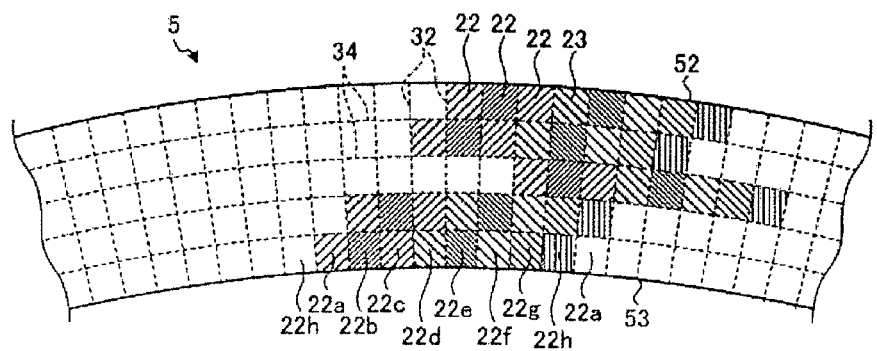
FIG. 2 is an explanatory drawing illustrating a portion of a decorative region of the pneumatic tire depicted in FIG. 1.
Figure 3:
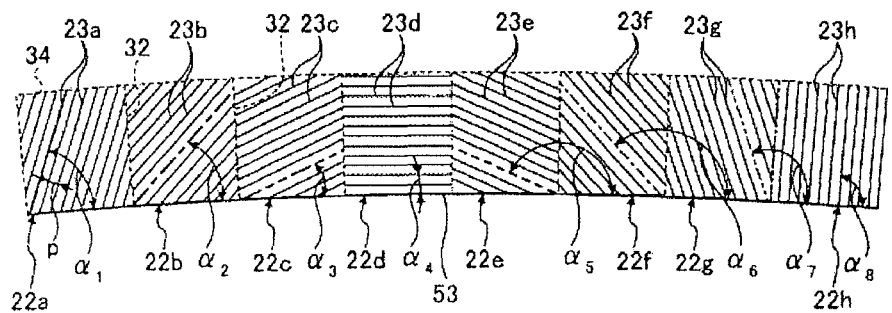
FIG. 3 is an enlarged side view illustrating the decorative region further enlarged.
Figure 4:
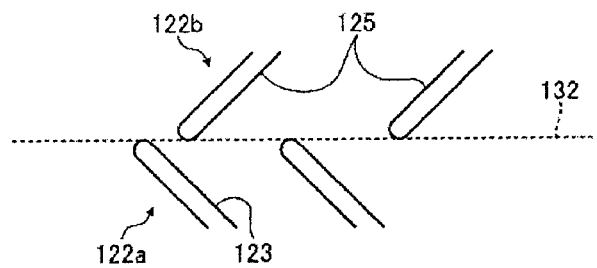
FIG. 4 is an enlarged side view illustrating an area around a boundary between decorative portions.

FIG. 1 is a side view of a pneumatic tire according to an embodiment of the present technology. FIG. 2 is an explanatory drawing illustrating a portion of a decorative region of the pneumatic tire depicted in FIG. 1. FIG. 3 is an enlarged side view illustrating the decorative region further enlarged. FIG. 4 is an enlarged side view illustrating an area around a boundary between decorative portions. As illustrated in FIG. 1, the pneumatic tire 1 includes a tread portion 2 that is in contact with a road surface; a side wall portion 3 that is assembled on a rim 6 and is visible on the outermost side in the tire width direction of the pneumatic tire 1 when mounted on a vehicle; and a bead portion 4 that interlocks with this rim 6 when the pneumatic tire 1 is assembled on the rim 6.

As illustrated in FIGS. 1 and 2, the side wall portion 3 has a decorative region (serration portion) 5 on a surface thereof. The decorative region 5 is formed in a shape that extends along the tire circumferential direction within a predetermined range in the tire radial direction of the side wall portion 3 or, in other words, in a circular shape. The decorative region 5 is fundamentally provided in a predetermined region in the tire radial direction, that is, in a region including a position outermost in the tire width direction, at a position of an end portion where a carcass (not illustrated), which constitutes a skeleton of the pneumatic tire 1, is folded over the bead portion 4, and overlapping portions of the carcass (carcass splice portions).

As illustrated in FIG. 2, the decorative region 5 is a toric region surrounded by an outer ring 52 and an inner ring 53. Note that in FIG. 2, only a portion having a constant width in the tire circumferential direction of the decorative region 5 is depicted, but, as illustrated in FIG. 1, the decorative region 5 is disposed throughout all regions in the tire circumferential direction. The outer ring 52 and the inner ring 53 are circles having a center of the pneumatic tire 1 in the radial direction as centers. Additionally, the outer ring 52 is a circle with a diameter greater than that of the inner ring 53.

The decorative region 5 is divided into a plurality of sections by multiple imaginary boundary lines 32 and multiple imaginary boundary lines 34. The imaginary boundary lines 32 are straight imaginary lines extended in the tire radial direction and are formed at a constant pitch in the tire circumferential direction. First end portions of the imaginary boundary lines 32 are located at the outer ring 52 and second end portions are located at the inner ring 53. In other words, the imaginary boundary lines 32 are straight lines extending from edge to edge of the decorative region 5 in the tire radial direction. The imaginary boundary lines 34 are imaginary lines that are extended in the tire circumferential direction and are concentric with the outer ring 52 and the inner ring 53, and are formed at a constant pitch in the tire radial direction.

As described above, the decorative region 5 is divided into a plurality of sections in the tire radial direction by the outer ring 52, the inner ring 53, and the imaginary boundary lines 34, and is divided into a plurality of sections in the tire circumferential direction by the imaginary boundary lines 32. In the decorative region 5, each section surrounded in the tire circumferential direction by two of the imaginary boundary lines 34, the imaginary boundary line 34 and the outer ring 52, or the imaginary boundary line 34 and the inner ring 53; and surrounded in the tire radial direction by two of the imaginary boundary lines 32 constitutes a decorative portion 22. Thus, a plurality of the decorative portion 22 is disposed in rows throughout an entire circumference in the tire circumferential direction, and a plurality of the decorative portion 22 is disposed in rows in the tire radial direction in the decorative region 5 of this embodiment. Note that the number of the decorative portions 22 constituting the decorative region 5 is not particularly limited provided that not less than two of the decorative portions are provided in the tire circumferential direction and the tire radial direction, respectively. Preferably, not less than three of the decorative portions are provided in the tire circumferential direction and the tire radial direction, respectively.

The decorative portion 22 includes a plurality of ridges 23. Note that in FIG. 2, the ridges 23 of a part of the decorative portions 22 are depicted with cross-hatching, and depiction of the ridges 23 in other decorative portions 22 is omitted. The ridges 23 are protrusions that protrude in the tire width direction, and extend in any single direction on the tire surface. The plurality of ridges 23 of the decorative portion 22 is disposed in rows, in a direction orthogonal to the extending direction thereof. Additionally, an angle (hereinafter referred to as the "ridge arrangement angle α") formed by a straight line and a line tangent to the inner ring 53 at a contact point between a line extended from a straight line of the ridges 23 and the inner ring 53 (hereinafter also referred to as the "ridge starting point") is the same angle. Note that in cases where the ridges are curved lines or the like, an angle formed by a straight imaginary line joining the starting point and ending point of the ridge and the line tangent to the inner ring 53 is the ridge arrangement angle.

Here, it is sufficient that the imaginary boundary lines 32 and 34 are imaginary lines that demarcate the edges of the decorative portions 22, and need not be formed so as to be actually visible on the decorative portions 22. The imaginary boundary lines 32 and 34 are lines that join end portions (end portions on a first side or end portions on a second side) of the ridges 23 formed in the corresponding decorative portion 22. In other words, the imaginary boundary lines are imaginary lines that join the end portions of ridges having the same ridge arrangement angle, and constitute boundaries between decorative portions having different ridge arrangement angles. Additionally, the imaginary boundary lines 32 and 34 are lines that overlap with the ridge 23 farthest to the edge of the corresponding region in cases where the imaginary boundary lines 32 and 34 are parallel with the ridges 23. In other words, in cases where the imaginary boundary line of the ridges 23 of the decorative portion is parallel with the ridges 23 of the contiguous decorative portion, the ridge 23 closest to the imaginary boundary line of said decorative portion is the imaginary boundary line. That is, an imaginary line joining a first end and a second end of the closest ridge 23 is the imaginary boundary line.

Next, the decorative portions 22 will be explained in more detail using FIG. 3. Note that in FIG. 3, decorative portions 22a, 22b, 22c, 22d, 22e, 22f, 22g, and 22h, which are in a portion on the inner ring 53 side, of the decorative portions 22 of the decorative region 5 are depicted. A boundary on the inner side in the tire radial direction of the decorative portions 22a, 22b, 22c, 22d, 22e, 22f, 22g, and 22h is the inner ring 53, and a boundary on the outer side in the tire radial direction (boundary with another decorative portion 22) is the imaginary boundary line 34. Additionally, a boundary between contiguous decorative portions in the tire circumferential direction of the decorative portions 22a, 22b, 22c, 22d, 22e, 22f, 22g, and 22h is the imaginary boundary line 32. For example, the decorative portion 22a and the decorative portion 22b are divided in the tire circumferential direction by the imaginary boundary line 32.

The decorative portion 22a includes a plurality of ridges 23a. An angle (ridge arrangement angle) formed by the ridges 23a and the line tangent to the inner ring 53 at the ridge starting point, which is a contact point between the inner ring 53 and an extended line of the ridges 23a, is an angle $\alpha_1$. The ridge arrangement angle $\alpha_1$ in this embodiment is 67.5°. Thus, depending on the position where the ridges 23a are formed, the angle formed with the line tangent to the inner ring 53 at the ridge starting point varies. Therefore, a shape is formed in which a distance between adjacent ridges 23a increases from the inner ring 53 toward the outer ring 52. Note that with the ridges 23a illustrated in FIG. 3, the ridges extend to a position contacting the inner ring 53, but in cases where the end portions of the ridges 23a on the inner ring 53 side do not contact the inner ring 53, specifically, in cases where the end portions contact imaginary boundary lines 32 and 34, it is sufficient that extended lines of the ridges 23 satisfy the ridge arrangement angle α.

Note that in this embodiment, the ridge arrangement angle of each of the ridges 23a is set at the angle $\alpha_1$, but the ridges 23a may be disposed so as to be aligned in a mutually parallel manner so that the angle (ridge arrangement angle) formed with the line tangent to the inner ring 53 at the ridge starting point, which is a contact point between the inner ring 53 and an extended line of one ridge 23a of the plurality of ridges 23a, is the angle $\alpha_1$. That is, the ridges 23a formed in the decorative portion 22a may be disposed in parallel, and the ridge arrangement angle of one arbitrary ridge 23a thereof may be configured to be the ridge arrangement angle $\alpha_1$ of the ridges 23a of the decorative portion 22a.

Additionally, the ridges 23a are disposed at a spacing so that a distance between adjacent ridges 23a (arrangement pitch, distance in a direction orthogonal to the extending direction of the ridges 23a) is constant. Here, the arrangement pitch of the ridges is preferably not less than 0.5 mm and not more than 5.0 mm. When the arrangement pitch of the ridges is within the range described above, the ridges can be disposed at an appropriate spacing in the decorative region.

The decorative portion 22b includes a plurality of ridges 23b. The ridge arrangement angle of the ridges 23b is an angle $\alpha_2$. The ridge arrangement angle $\alpha_2$ in this embodiment is 45°. The decorative portion 22c includes a plurality of ridges 23c. The ridge arrangement angle of the ridges 23c is an angle $\alpha_3$. The ridge arrangement angle $\alpha_3$ in this embodiment is 22.5°. The decorative portion 22d includes a plurality of ridges 23d. The ridge arrangement angle of the ridges 23d is an angle $\alpha_4$. The ridge arrangement angle $\alpha_4$ in this embodiment is 0°) (180°. The decorative portion 22e includes a plurality of ridges 23e. The ridge arrangement angle of the ridges 23e is an angle $\alpha_5$. The ridge arrangement angle $\alpha_5$ in this embodiment is 157.5°. The decorative portion 22f includes a plurality of ridges 23f. The ridge arrangement angle of the ridges 23f is an angle $\alpha_6$. The ridge arrangement angle $\alpha_6$ in this embodiment is 135°. The decorative portion 22g includes a plurality of ridges 23g.

The ridge arrangement angle of the ridges 23g is an angle $\alpha_7$. The ridge arrangement angle $\alpha_8$ in this embodiment is 112.5°. The decorative portion 22h includes a plurality of ridges 23h. The ridge arrangement angle of the ridges 23h is an angle $\alpha_8$. The ridge arrangement angle $\alpha_8$ in this embodiment is 90°.

One unit of the decorative region 5 is constituted by the eight decorative portions, decorative portion 22a to decorative portion 22h, and said unit is disposed continuously in the tire circumferential direction. That is, a first side of the decorative portion 22a in the tire circumferential direction is contiguous with the decorative portion 22b via the imaginary boundary line 32, and a second side in the tire circumferential direction is contiguous with the decorative portion 22h via the imaginary boundary line 32. Additionally, the decorative portions 22 that are sandwiched between the imaginary boundary line 34 and the imaginary boundary line 34, and the decorative portions 22 that are sandwiched between the imaginary boundary line 34 and the outer ring 52; that is, the decorative portions 22, which are farther to the outer side in the tire radial direction than the decorative portions 22a to 22h illustrated in FIG. 3, have a ridge arrangement angle that is an angle different than that of the decorative portion that is contiguous thereto in the tire circumferential direction.

Additionally, in the decorative region 5, the ridge arrangement angles of the decorative portion and the decorative portion that is contiguous with said decorative portion in the tire radial direction are different angles. In other words, with the decorative portions 22, just as with the decorative portions 22 that are contiguous in the tire circumferential direction, the decorative portions 22 that are contiguous in the tire radial direction also have different ridge arrangement angles.

Next, a relationship of the ridges of two contiguous decorative portions near the imaginary boundary line will be explained using FIG. 4. Note that a relationship of the ridges of two contiguous decorative portions near the imaginary boundary line is the same. Therefore, the relationship at the imaginary boundary line 132 between the ridges 123 of the decorative portion 122a and the ridges 125 of the contiguous decorative portion 122b is described below, being representative of relationships near the imaginary boundary line of the ridges of two contiguous decorative portions. The decorative portion 122a and the decorative portion 122b are two contiguous decorative portions that were arbitrarily extracted from the decorative region. As illustrated in FIG. 4, first end portions of the ridges 123 of the decorative portion 122a extend to the imaginary boundary line 132. Additionally, second end portions of the ridges 125 of the decorative portion 122b extend to the imaginary boundary line 132. In other words, the imaginary boundary line 132 is a line joining the first end portions of the ridges 123 of the decorative portion 122a and is a line joining the second end portions of the ridges 125 of the decorative portion 122b. As illustrated in FIG. 4, the ridges 123 of the decorative portion 122a are formed at positions that do not overlap with the ridges 125 of the decorative portion 122b. Specifically, the ridges 123 of the decorative portion 122a are formed at positions different from those of the ridges 125 of the decorative portion 122b, and even though the end portions of both ridges are positioned on the imaginary boundary line 132, the first end portions of the ridges 123 of the decorative portion 122a do not overlap with the second end portions of the ridges 125 of the decorative portion 122b.

As described above, the decorative region 5 has a structure in which multiple decorative portions 22 are disposed in rows in the tire circumferential direction and the tire radial direction, respectively. Additionally, the ridge arrangement angle $\alpha$ of one of the decorative portions 22 is different than the ridge arrangement angle $\alpha$ of a contiguous decorative portion 22. Therefore, when the imaginary boundary lines 32 and 34 are passed through the decorative region 5, the ridge arrangement angles $\alpha$ will differ. That is, the imaginary boundary lines 32 and 34 are boundaries and, in the decorative region 5, with each of the imaginary boundary lines 32 and 34, the ridge arrangement angle of the ridges on a first side and the ridge arrangement angle of the ridges on the second side thereof are different angles.

The pneumatic tire 1 has the configuration described above and the decorative region 5, in which a plurality of decorative portions that satisfy the conditions described above are continuously provided in the tire circumferential direction and the tire radial direction, respectively, is provided in regions including the position outermost in the tire width direction, at a position of an end portion where a carcass (not illustrated), which constitutes a skeleton of the pneumatic tire 1, is folded over the bead portion 4, and overlapping portions of the carcass (carcass splice portions). Therefore, bulges on the surface of the side wall portion 3 where the carcass is folded over and at the carcass splice portions can be made unnoticeable while enhancing the appearance of the outermost side in the tire width direction (the side wall portion 3) by the decorative portions 22 constituting the decorative region 5.

Furthermore, in the pneumatic tire 1, a plurality of the decorative portions that satisfy the conditions described above are continuously provided in the tire circumferential direction and the tire radial direction, respectively, in the decorative region 5. Therefore, effects of making bulges on the surface of the side wall portion 3 where the carcass is folded over and at the carcass splice portions unnoticeable can be more preferably obtained. Furthermore, in the pneumatic tire 1, a plurality of the decorative portions that satisfy the conditions described above are continuously provided in the tire circumferential direction and the tire radial direction, respectively, in the decorative region 5. Therefore, the three-dimensional appearance of the side wall portion 3 can be further improved.

As described above, in the pneumatic tire 1, a plurality of the decorative portions are continuously provided in the tire circumferential direction and the tire radial direction, respectively, in the decorative region 5 and, furthermore, the ridge arrangement angle $\alpha$ of one of the decorative portions is configured to differ from the ridge arrangement angle $\alpha$ of each of the contiguous decorative portions. Therefore, variations in light reflection can be caused between decorative regions, unevennesses in the side wall portion 3 caused by carcass splice portions and portions where the carcass is folded up can be camouflaged and made unnoticeable, and the tire can be made to appear more three-dimensional.

In the embodiment described above, the imaginary boundary lines that divide the decorative portions constituting the decorative region 5 into a plurality of sections are straight lines extending in the tire radial direction (the imaginary boundary line 32) and circles that are concentric with the tire circumferential direction (the imaginary boundary line 34), but are not limited thereto. The form and disposal position of the imaginary boundary lines that divide the decorative region 5 into a plurality of decorative portions is not particularly limited, provided that the imaginary boundary lines can divide said region into a plurality of portions in the tire circumferential direction and the tire radial direction, respectively. That is, the disposal pattern in the decorative region 5 is not particularly limited, provided that a plurality of the decorative portions is disposed in the tire radial direction and the tire circumferential direction, respectively.

Hereinafter, other examples of the decorative region will be explained using FIGS. 5A to 5F. FIGS. 5A to 5F are explanatory drawings, each illustrating a portion of other examples of the decorative region. Note that in FIGS. 5A to 5F, only a portion having a constant width in the tire circumferential direction of the decorative region is depicted, but, as illustrated in FIG. 1, each of the decorative regions is disposed throughout all regions in the tire circumferential direction.

Figure 5A:
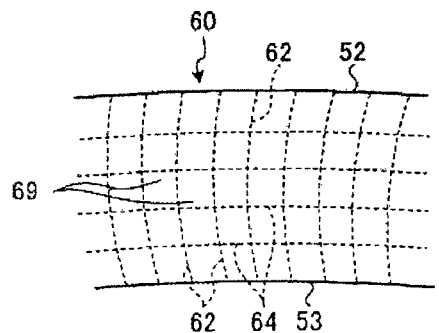
FIG. 5A is an explanatory drawing illustrating a portion of another example of the decorative region.

The decorative region 60 illustrated in FIG. 5A is a toric region surrounded by the outer ring 52 and the inner ring 53. The decorative region 60 is divided into a plurality of sections by multiple imaginary boundary lines 62 and multiple imaginary boundary lines 64. The imaginary boundary lines 62 are curved (arcing) imaginary lines, formed by bending straight lines extending in the tire radial direction so as to bend in a convex direction in the tire circumferential direction, and are formed at a constant pitch in the tire circumferential direction. First end portions of the imaginary boundary lines 62 are located at the outer ring 52 and second end portions are located at the inner ring 53. In other words, the imaginary boundary lines 62 are curved lines extending from edge to edge of the decorative region 60 in the tire radial direction. The imaginary boundary lines 64 are imaginary lines that are extended in the tire circumferential direction and are concentric with the outer ring 52 and the inner ring 53, and are formed at a constant pitch in the tire radial direction. The decorative region 60 is divided into a plurality of sections in the tire radial direction by the outer ring 52, the inner ring 53, and the imaginary boundary lines 64, and is divided into a plurality of sections in the tire circumferential direction by the imaginary boundary lines 62. In the decorative region 60, each region surrounded in the tire circumferential direction by two of the imaginary boundary lines 64, the imaginary boundary line 64 and the outer ring 52, or the imaginary boundary line 64 and the inner ring 53; and surrounded in the tire radial direction by two of the imaginary boundary lines 62 constitutes a decorative portion 69.

Figure 5B:
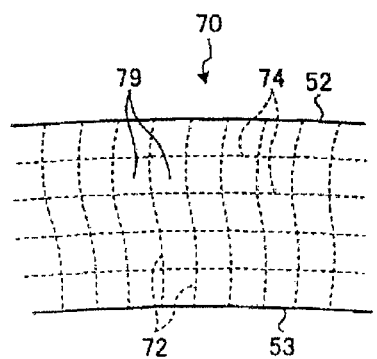
FIG. 5B is an explanatory drawing illustrating a portion of another example of the decorative region.

The decorative region 70 illustrated in FIG. 5B is a toric region surrounded by the outer ring 52 and the inner ring 53. The decorative region 70 is divided into a plurality of sections by multiple imaginary boundary lines 72 and multiple imaginary boundary lines 74. The imaginary boundary lines 72 are curved imaginary lines, formed by bending straight lines extending in the tire radial direction so as to bend in concave/convex directions in the tire circumferential direction, and are formed at a constant pitch in the tire circumferential direction. First end portions of the imaginary boundary lines 72 are located at the outer ring 52 and second end portions are located at the inner ring 53. In other words, the imaginary boundary lines 72 are curved lines extending from edge to edge of the decorative region 70 in the tire radial direction. The imaginary boundary lines 74 are imaginary lines that are extended in the tire circumferential direction and are concentric with the outer ring 52 and the inner ring 53, and are formed at a constant pitch in the tire radial direction. The decorative region 70 is divided into a plurality of sections in the tire radial direction by the outer ring 52, the inner ring 53, and the imaginary boundary lines 74, and is divided into a plurality of sections in the tire circumferential direction by the imaginary boundary lines 72. In the decorative region 70, each region surrounded in the tire circumferential direction by two of the imaginary boundary lines 74, the imaginary boundary line 74 and the outer ring 52, or the imaginary boundary line 74 and the inner ring 53; and surrounded in the tire radial direction by two of the imaginary boundary lines 72 constitutes a decorative portion 79.

Figure 5C:
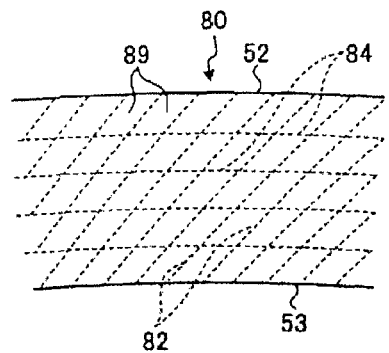
FIG. 5C is an explanatory drawing illustrating a portion of another example of the decorative region.

The decorative region 80 illustrated in FIG. 5C is a toric region surrounded by the outer ring 52 and the inner ring 53. The decorative region 80 is divided into a plurality of sections by multiple imaginary boundary lines 82 and multiple imaginary boundary lines 84. The imaginary boundary lines 82 are inclined straight imaginary lines, formed by inclining straight lines extending in the tire radial direction at a prescribed angle with respect to the tire radial direction, and are formed at a constant pitch in the tire circumferential direction. First end portions of the imaginary boundary lines 82 are located at the outer ring 52 and second end portions are located at the inner ring 53. In other words, the imaginary boundary lines 82 are straight lines extending from edge to edge of the decorative region 80 in the tire radial direction. The imaginary boundary lines 84 are imaginary lines that are extended in the tire circumferential direction and are concentric with the outer ring 52 and the inner ring 53, and are formed at a constant pitch in the tire radial direction. The decorative region 80 is divided into a plurality of sections in the tire radial direction by the outer ring 52, the inner ring 53, and the imaginary boundary lines 84, and is divided into a plurality of sections in the tire circumferential direction by the imaginary boundary lines 82. In the decorative region 80, each region surrounded in the tire circumferential direction by two of the imaginary boundary lines 84, the imaginary boundary line 84 and the outer ring 52, or the imaginary boundary line 84 and the inner ring 53; and surrounded in the tire radial direction by two of the imaginary boundary lines 82 constitutes a decorative portion 89.

Figure 5D:
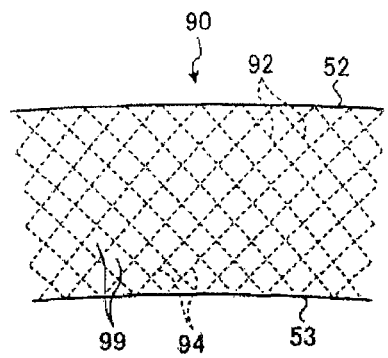
FIG. 5D is an explanatory drawing illustrating a portion of another example of the decorative region.

The decorative region 90 illustrated in FIG. 5D is a toric region surrounded by the outer ring 52 and the inner ring 53. The decorative region 90 is divided into a plurality of sections by multiple imaginary boundary lines 92 and multiple imaginary boundary lines 94. The imaginary boundary lines 92 are inclined straight imaginary lines, formed by inclining straight lines extending in the tire radial direction at a prescribed angle with respect to the tire radial direction, and are formed at a constant pitch in the tire circumferential direction. First end portions of the imaginary boundary lines 92 are located at the outer ring 52 and second end portions are located at the inner ring 53. In other words, the imaginary boundary lines 92 are straight lines extending from edge to edge of the decorative region 90 in the tire radial direction. The imaginary boundary lines 94 are inclined straight imaginary lines, formed by inclining straight lines extending in the tire radial direction at a prescribed angle opposite the imaginary boundary lines 92 with respect to the tire radial direction, and are formed at a constant pitch in the tire circumferential direction. First end portions of the imaginary boundary lines 94 are located at the outer ring 52 and second end portions are located at the inner ring 53. In other words, the imaginary boundary lines 94 are straight lines extending from edge to edge of the decorative region 90 in the tire radial direction. The region between the outer ring 52 and the inner ring 53 of the decorative region 90 is divided into a plurality of sections by two of the imaginary boundary lines 92 and two of the imaginary boundary lines 94. Sections of the decorative region 90 contacting the outer ring 52 are divided from other sections by the outer ring 52, one of the imaginary boundary lines 92, and one of the imaginary boundary lines 94. Sections of the decorative region 90 contacting the inner ring 53 are divided from other sections by the inner ring 53, one of the imaginary boundary lines 92, and one of the imaginary boundary lines 94. As described above, in the decorative region 90, each region surrounded by two of the imaginary boundary lines 92 and two of the imaginary boundary lines 94, the outer ring 52 and one of the imaginary boundary lines 92 and one of the imaginary boundary lines 94, or the inner ring 53 and one of the imaginary boundary lines 92 and one of the imaginary boundary lines 94 constitutes a decorative portion 99.

Figure 5E:
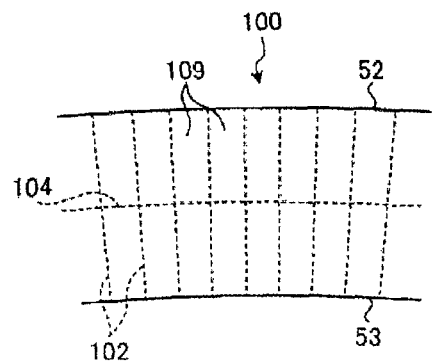
FIG. 5E is an explanatory drawing illustrating a portion of another example of the decorative region.

The decorative region 100 illustrated in FIG. 5E is a toric region surrounded by the outer ring 52 and the inner ring 53. The decorative region 100 is divided into a plurality of sections by multiple imaginary boundary lines 102 and one imaginary boundary line 104. The imaginary boundary lines 102 are straight imaginary lines extended in the tire radial direction and are formed at a constant pitch in the tire circumferential direction. First end portions of the imaginary boundary lines 102 are located at the outer ring 52 and second end portions are located at the inner ring 53. In other words, the imaginary boundary lines 102 are straight lines extending from edge to edge of the decorative region 100 in the tire radial direction. The imaginary boundary line 104 is an imaginary line that is extended in the tire circumferential direction and is concentric with the outer ring 52 and the inner ring 53, and is disposed at a midway point between the outer ring 52 and the inner ring 53. The decorative region 100 is divided into two sections in the tire radial direction by the outer ring 52, the inner ring 53, and the imaginary boundary line 104, and is divided into a plurality of sections in the tire circumferential direction by the imaginary boundary lines 102. In the decorative region 100, each region surrounded in the tire circumferential direction by the imaginary boundary line 104 and the outer ring 52 or the imaginary boundary line 104 and the inner ring 53; and surrounded in the tire radial direction by two of the imaginary boundary lines 102 constitutes a decorative portion 109.

Figure 5F:
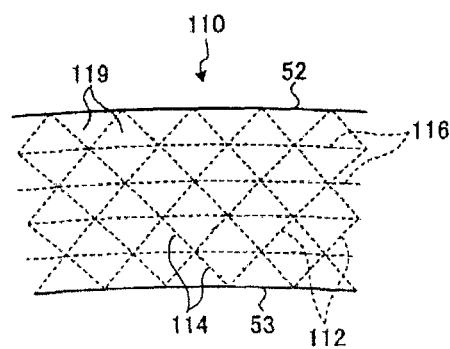
FIG. 5F is an explanatory drawing illustrating a portion of another example of the decorative region.

The decorative region 110 illustrated in FIG. 5F is a toric region surrounded by the outer ring 52 and the inner ring 53. The decorative region 110 is divided into a plurality of sections by multiple imaginary boundary lines 112, multiple imaginary boundary lines 114 and multiple imaginary boundary lines 116. The imaginary boundary lines 112 are inclined straight imaginary lines, formed by inclining straight lines extending in the tire radial direction at a prescribed angle with respect to the tire radial direction, and are formed at a constant pitch in the tire circumferential direction. First end portions of the imaginary boundary lines 112 are located at the outer ring 52 and second end portions are located at the inner ring 53. In other words, the imaginary boundary lines 112 are straight lines extending from edge to edge of the decorative region 110 in the tire radial direction. The imaginary boundary lines 114 are inclined straight imaginary lines, formed by inclining straight lines extending in the tire radial direction at a prescribed angle opposite the imaginary boundary lines 112 with respect to the tire radial direction, and are formed at a constant pitch in the tire circumferential direction. First end portions of the imaginary boundary lines 114 are located at the outer ring 52 and second end portions are located at the inner ring 53. In other words, the imaginary boundary lines 114 are straight lines extending from edge to edge of the decorative region 110 in the tire radial direction. The imaginary boundary lines 116 are imaginary lines that are extended in the tire circumferential direction and are concentric with the outer ring 52 and the inner ring 53, and are formed at a constant pitch in the tire radial direction. Additionally, a position in the tire radial direction of the imaginary boundary line 116 passes through an intersection of the imaginary boundary line 112 and the imaginary boundary line 114, which is located at the same position in the tire radial direction. The region between the outer ring 52 and the inner ring 53 of the decorative region 110 is divided into a plurality of sections by one of the imaginary boundary lines 112, one of the imaginary boundary lines 114, and one of the imaginary boundary lines 116. Sections of the decorative region 110 contacting the outer ring 52 are divided from other sections by the outer ring 52, one of the imaginary boundary lines 112, and one of the imaginary boundary lines 114. Sections of the decorative region 110 contacting the inner ring 53 are divided from other sections by the inner ring 53, one of the imaginary boundary lines 112, and one of the imaginary boundary lines 114. As described above, in the decorative region 110, each region surrounded by one of the imaginary boundary lines 112, one of the imaginary boundary lines 114, and one of the imaginary boundary lines 116; the outer ring 52, one of the imaginary boundary lines 112, and one of the imaginary boundary lines 114; or the inner ring 53, one of the imaginary boundary lines 112, and one of the imaginary boundary lines 114 constitutes a decorative portion 119.

As described above, the decorative region can have various forms, defined by straight or curved imaginary boundary lines, combinations of straight and curved imaginary boundary lines, or the like. Additionally, it is sufficient that the decorative region be divided into a plurality of sections in the tire radial direction and the tire circumferential direction. That is, it is sufficient that a plurality of decorative portions be formed at any position that is on a straight line parallel with the tire radial direction and that is concentric with the tire circumferential direction, and it is not necessary that straight imaginary boundary lines that are parallel with the tire radial direction and imaginary boundary lines that are circles concentric with the tire circumferential direction be provided.

Moreover, by forming the imaginary boundary line systematically (e.g. in parallel at a constant pitch) as described above in the embodiment, the decorative region can be provided with a form in which an identical, repeating pattern of the decorative portion is formed. As a result, camouflaging effects of unevennesses can be further enhanced and the tire can be made to appear more three-dimensional. Therefore, while it is preferable that the imaginary boundary lines be formed systematically in the decorative region as described above in the embodiment, the present technology is not limited thereto. For example, in the decorative region, the pitch and form of the imaginary boundary lines may vary based on position, or may include decorative portions having various forms. For example, a decorative region may be provided in which a rectangular decorative portion, a pentagonal decorative portion, and a decorative portion that is partially curved are provided so as to be contiguous around a triangular decorative portion.

Here, the ridge arrangement angle $\alpha$ of the decorative portion is preferably not less than 20° and not more than 160° different from the ridge arrangement angle $\alpha$ of the contiguous decorative portions. In other words, the ridge arrangement angle $\alpha$ of the decorative portion and the ridge arrangement angle $\alpha$ of the contiguous decorative portions are preferably not less than 20° and not more than 160° different. By configuring the ridge arrangement angle $\alpha$ of the decorative portion and the ridge arrangement angle $\alpha$ of the contiguous decorative portions to be not less than 20° and not more than 160° different, camouflaging effects of unevennesses can be further enhanced and the tire can be made to appear more three-dimensional.

Additionally, unevennesses in the side wall portion 3 can be further favorably camouflaged and the three-dimensional effect can be further enhanced by configuring the pneumatic tire 1 so that the imaginary boundary lines overlap, such as in this embodiment. Note that it is not necessary that the imaginary boundary line of the decorative portion overlap with the imaginary boundary line of the contiguous decorative portion.

Figure 6:
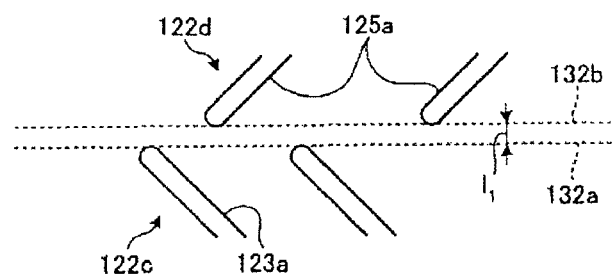
FIG. 6 is an enlarged side view illustrating another example of an area around a boundary between decorative portions.
Figure 7:
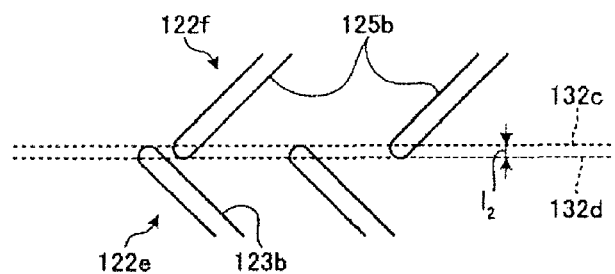
FIG. 7 is an enlarged side view illustrating another example of an area around a boundary between decorative portions.

FIGS. 6 and 7 are enlarged side views illustrating other examples of an area around a boundary between decorative portions. With the decorative region illustrated in FIG. 6, an imaginary boundary line 132a joining first end portions of ridges 123a in the decorative portion 122c and imaginary boundary line 132b joining second end portions of ridges 125a in the decorative portion 122d are separated by a distance $I_1$. Ridges are not formed between the imaginary boundary line 132a and the imaginary boundary line 132b in the decorative region illustrated in FIG. 6. Next, with the decorative region illustrated in FIG. 7, an imaginary boundary line 132d joining first end portions of ridges 123b in the decorative portion 122e and an imaginary boundary line 132c joining second end portions of ridges 125b in the decorative portion 122f are separated by a distance $I_2$. The ridges 123b and the ridges 125b are both formed between the imaginary boundary line 132c and the imaginary boundary line 132d in the decorative region illustrated in FIG. 7 or, rather, the ridges overlap.

When the first imaginary boundary line joining the end portions of the ridges of a decorative portion that are on a side adjacent to a contiguous decorative portion is separated from the second imaginary boundary line joining end portions of the ridges of the contiguous decorative portion on a side adjacent to the first imaginary boundary line as illustrated in FIG. 6, or overlap as illustrated in FIG. 7, the distance between the first imaginary boundary line and the second imaginary boundary line (i.e. the distance $I_1$ or the distance $I_2$) is configured to be less than 1 mm. Thus, the effects described above can be obtained.

Additionally, as described in this embodiment, with the pneumatic tire 1, ridge end portions of contiguous decorative portions are formed so as to be disconnected and, therefore, cracking and growth of cracks in the recesses of the ridges can be suppressed and durability can be enhanced. With the pneumatic tire 1, the ridges of the decorative portion and the ridges of the contiguous decorative portion preferably have a disconnected form, because such a configuration leads to the effects described above being obtained. However, alternately, the ridges of the decorative portion and the ridges of the contiguous decorative portion may have a connected form.

The decorative region preferably has not less than three types and not more than twelve types of the decorative portions having different ridge arrangement angles α. In other words, the decorative region preferably has a configuration including a combination of decorative portions having not less than three types and not more than twelve types of ridge arrangement angles α. Thus, the effect of camouflaging the unevennesses of the side wall portion 3 can be enhanced by providing decorative portions having not less than three types of the ridge arrangement angles α, and manufacturing costs can be reduced due to being able to reduce the number of types of dies by providing decorative portions having not more than twelve types of the ridge arrangement angles α.

Here, the decorative portions are preferably disposed in the decorative region in the tire circumferential direction and/or the tire radial direction in a combination where the ridge arrangement angle α varies periodically. In other words, units of the decorative portions are preferably disposed in rows in the tire circumferential direction and/or the tire radial direction, said unit being a combination of decorative portions in which the ridge arrangement angle α varies at a predetermined pattern and order. Thus, the tire can be made to appear more three-dimensional by varying the ridge arrangement angle α in a periodic manner.

Furthermore, a plurality of the decorative portions is preferably disposed in the decorative region in the tire circumferential direction and/or the tire radial direction, in order of stepwise ascending or descending size of the ridge arrangement angle α. In other words, the decorative portions are preferably disposed in order of stepwise ascending or descending size of the ridge arrangement angle α. Thus, the tire can be made to appear more three-dimensional by varying the ridge arrangement angle α in a step-wise manner.

Figure 8:
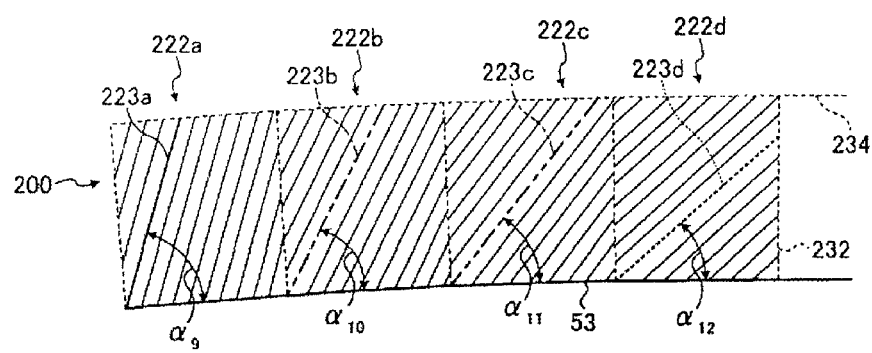
FIG. 8 is an enlarged side view illustrating another example of a decorative region of the pneumatic tire.

FIG. 8 is an enlarged side view illustrating another example of a decorative region of the pneumatic tire. Note that in FIG. 8, decorative portions 222a, 222b, 222c, and 222d, which are in a portion on the inner ring 53 side, of the decorative portions of the decorative region 200 are depicted. A boundary on the inner side in the tire radial direction of the decorative portions 222a, 222b, 222c, and 222d is the inner ring 53, and a boundary on the outer side in the tire radial direction (boundary with another decorative portion) is an imaginary boundary line 234. Additionally, a boundary between contiguous decorative portions in the tire circumferential direction of the decorative portions 222a, 222b, 222c, and 222d is an imaginary boundary line 232. For example, the decorative portion 222a and the decorative portion 222b are separated in the tire circumferential direction by the imaginary boundary line 232.

The decorative portion 222a includes a plurality of ridges 223a. The ridge arrangement angle of the ridges 223a is an angle $α_9$. The ridge arrangement angle $α_9$ in this embodiment is 70°. The decorative portion 222b includes a plurality of ridges 223b. The ridge arrangement angle of the ridges 223b is an angle $α_{10}$. The ridge arrangement angle $α_{10}$ in this embodiment is 60°. The decorative portion 222c includes a plurality of ridges 223c. The ridge arrangement angle of the ridges 223c is an angle $α_{11}$. The ridge arrangement angle $α_{11}$ in this embodiment is 50°. The decorative portion 222d includes a plurality of ridges 223d. The ridge arrangement angle of the ridges 223d is an angle $α_{12}$. The ridge arrangement angle $α_{12}$ in this embodiment is 40°. The tire can be made to appear more three-dimensional by varying the ridge arrangement angle α of the decorative portions constituting the decorative region in a step-wise manner, as with the decorative region 200 illustrated in FIG. 8.

Additionally, with the decorative region 200 illustrated in FIG. 8, the ridge arrangement angle of the decorative portions that are not depicted is decreased by 10° with each contiguous decorative portion (170° follows 0°). Thereby, the decorative portions can be disposed in order of stepwise ascending or descending size of the ridge arrangement angle α. Moreover, the decorative portions 222a, 222b, 222c, and 222d constitute a unit, said unit being disposed in plurality in the tire circumferential direction. Thus, a combination of decorative portions in which the ridge arrangement angle α varies periodically can be disposed.

Additionally, an area (area of a surface of the side wall portion) of the decorative portion is preferably not less than 0.3 cm² and not more than 10.0 cm². By configuring the area of the decorative portion to be not less than 0.3 cm², the number of decorative portions disposed in the decorative region can be maintained to or less than a suitable number, and increases in fabrication costs for creating the dies for forming the decorative portions can be suppressed. By configuring the area of the decorative portion to be not more than 10.0 cm², camouflaging effects of unevennesses in the side wall portion can be further enhanced.

Additionally, preferably at least one of the decorative portions included in the decorative region has a ridge length per unit area different than the ridge length per unit area included in the decorative portions. In other words, the decorative region preferably is provided with a decorative portion that has a different ridge length per unit area. Here, "ridge length per unit area" refers to a total extending distance of the ridges included in one unit area. Because the decorative region is provided with a decorative portion having a different ridge length per unit area, ridge density between decorative portions can be varied roughly and finely, variations in light reflection can be more appropriately caused, and camouflaging effects of unevennesses in the side wall portion 3 can be enhanced. The decorative portions having the different ridge length per unit area are preferably disposed in the decorative region of the decorative region 5 so as to repeat in the tire circumferential direction. Thus, the tire can be configured so as to appear more three-dimensional. Note that by varying the arrangement pitch of the ridges, the ridge length per unit area of decorative portions included in the decorative region can be adjusted. That is, by providing at least one decorative portion that has an arrangement pitch p that is different from the arrangement pitch p of the ridges included in the other decorative portions, at least one decorative portion having a ridge length per unit area that is different from the ridge length per unit area included in the other decorative portions can be provided. Additionally, the ridge length per unit area can be varied by forming the lines of the ridges per decorative portion differently, for example, into straight lines and curved lines.

Figure 9:
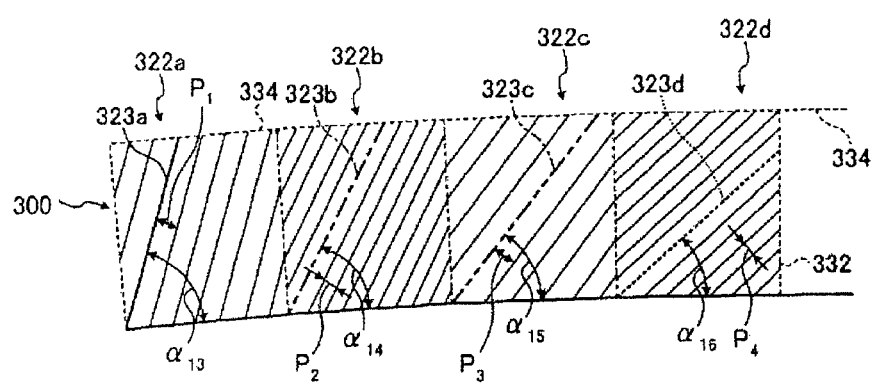
FIG. 9 is an enlarged side view illustrating another example of a decorative region of the pneumatic tire.

FIG. 9 is an enlarged side view illustrating another example of a decorative region of the pneumatic tire. Note that in FIG. 9, decorative portions 322a, 322b, 322c, and 322d, which are in a portion on the inner ring 53 side, of the decorative portions of the decorative region 300 are depicted. A boundary on the inner side in the tire radial direction of the decorative portions 322a, 322b, 322c, and 322d is the inner ring 53, and a boundary on the outer side in the tire radial direction (boundary with another decorative portion) is an imaginary boundary line 334. Additionally, a boundary between contiguous decorative portions in the tire circumferential direction of the decorative portions 322a, 322b, 322c, and 322d is an imaginary boundary line 332. For example, the decorative portion 322a and the decorative portion 322b are separated in the tire circumferential direction by the imaginary boundary line 332.

The decorative portion 322a includes a plurality of ridges 323a. The ridge arrangement angle of the ridges 323a is an angle $\alpha_{13}$. The ridge arrangement angle $\alpha_{13}$ in this embodiment is 70°. Additionally, the arrangement pitch of the ridges 323a of the decorative portion 322a is $P_1$. The decorative portion 322b includes a plurality of ridges 323b. The ridge arrangement angle of the ridges 323b is an angle $\alpha_{14}$. The ridge arrangement angle $\alpha_{14}$ in this embodiment is 60°. Additionally, the arrangement pitch of the ridges 323b of the decorative portion 322b is $P_2$. The arrangement pitch $P_2$ is a distance that is shorter than the arrangement pitch $P_1$.

Thus, the ridges 323b of the decorative portion 322b are more densely disposed than the ridges 323a of the decorative portion 322a, and the ridge length per unit area of the decorative portion 322b is longer than the ridge length per unit area of the decorative portion 322a. The decorative portion 322c includes a plurality of ridges 323c. The ridge arrangement angle of the ridges 323c is an angle $\alpha_{15}$. The ridge arrangement angle $\alpha_{15}$ in this embodiment is 50°. Additionally, the arrangement pitch of the ridges 323c of the decorative portion 322c is $P_3$. The arrangement pitch $P_3$ is a distance that is longer than the arrangement pitch $P_1$. Thus, the ridges 323c of the decorative portion 322c are more widely disposed than the ridges 323a of the decorative portion 322a, and the ridge length per unit area of the decorative portion 322c is shorter than the ridge length per unit area of the decorative portion 322a. The decorative portion 322d includes a plurality of ridges 323d. The ridge arrangement angle of the ridges 323d is an angle $\alpha_{16}$. The ridge arrangement angle $\alpha_{16}$ in this embodiment is 40°. Additionally, the arrangement pitch of the ridges 323d of the decorative portion 322d is $P_4$. The arrangement pitch $P_4$ is a distance that is the same as the arrangement pitch $P_2$. The ridge length per unit area of the decorative portion 322d is the same as the ridge length per unit area of the decorative portion 322b. Because a decorative portion is included in the decorative region 300 that has a ridge length per unit area that is different from the ridge length per unit area of the other decorative portions as illustrated in FIG. 9 or, in other words, because decorative portions are included in which the ridge length per unit area varies, the tire can be made to appear more three-dimensional.

Additionally, in a pneumatic tire, the decorative region is preferably provided throughout all regions of the side wall portion of the tire, as described above in the embodiment. Additionally, unevennesses in the side wall portion 3 can be more favorably camouflaged and the three-dimensional effect can be further enhanced by configuring the pneumatic tire so that the decorative region is provided in all regions thereof in the tire circumferential direction. Note that the pneumatic tire may have a configuration in which the decorative region is provided partially in the tire circumferential direction, or may be provided in a plurality so as to be separate. Additionally, in the embodiment described above, an example was described in which only ridges were formed in the decorative region, however, alphanumerics, marks, and the like (i.e. alphanumerics, brand names, and the like for the purpose of identifying the tire) may be formed therein. When providing alphanumerics or marks in the decorative region, ridges may be omitted from the portion where the alphanumerics or marks are formed, or a configuration may be used in which only the outlines of the alphanumerics or marks are left and ridges are formed in the other portions (area within the alphanumerics, or the like). Visibility of branding and the like can be enhanced by disposing alphanumerics or marks of brands, or the like, in the decorative region.

Next, the pneumatic tire will be explained in more detail using test examples. In the test examples, a pneumatic tire having a tire size of 205/55R16 91V and a rim size of 16×6.5 JJ was used. Ridges that constitute decorative regions of a Conventional Example, Comparative Examples, and Working Examples were formed in regions corresponding to the decorative region 5 of a pneumatic tire having the size described above. Each tire was then evaluated based on various criteria.

In the pneumatic tire of the Conventional Example, multiple ridges were formed in the decorative region. Note that the multiple ridges formed in the decorative region were formed so that there was a single ridge arrangement angle, that is, so that there was one type of decorative portion in the decorative region. In other words, the multiple ridges were all angled at the same ridge arrangement angle.

In the test examples, pneumatic tires of Comparative Examples 1 and 2 were evaluated as Comparative Examples. The pneumatic tire of Comparative Example 1 was provided with imaginary boundary lines (boundary lines) so as to form a vertical striped pattern. That is, only imaginary boundary lines extending in the tire radial direction were provided as the imaginary boundary lines, a plurality of decorative portions were provided in the tire circumferential direction in the decorative region, and one decorative portion was provided in the tire radial direction. Moreover, two types of decorative portions were disposed in the decorative region so as to alternate in the tire circumferential direction (circumferential direction). Additionally, only one type of decorative portion was provided in the decorative region in the tire radial direction (radial direction). A difference in the ridge arrangement angles of contiguous decorative portions (difference between the ridge arrangement angle α of one decorative portion and the ridge arrangement angle α of a contiguous decorative portion) was 20°. The area of one of the decorative portions in the decorative region was 15.0 cm². In the decorative region, the ridges of the decorative portion and the ridges of the contiguous decorative portion are not connected. Moreover, in the decorative region, there is no decorative portion with a different total ridge length per unit area or, in other words, the total ridge lengths per unit area of all of the decorative portions are the same.

The pneumatic tire of Comparative Example 2 was provided with imaginary boundary lines (boundary lines) so as to form a horizontal striped pattern. That is, only imaginary boundary lines extending in the tire circumferential direction were provided as the imaginary boundary lines, a plurality of decorative portions was provided in the tire radial direction in the decorative region, and one decorative portion was provided in the tire circumferential direction. In other words, the decorative region was configured so that a plurality of ring-shaped decorative portions having differing sizes in the radial direction was provided. Moreover, two types of decorative portions were disposed in the decorative region so as to alternate in the tire radial direction (radial direction). Additionally, only one type of decorative portion was provided in the decorative region in the tire circumferential direction (circumferential direction). A difference in the ridge arrangement angles of contiguous decorative portions (difference between the ridge arrangement angle α of one decorative portion and the ridge arrangement angle α of a contiguous decorative portion) was 20°. In the decorative region, the ridges of the decorative portion and the ridges of the contiguous decorative portion are not connected. Moreover, in the decorative region, there is no decorative portion with a different total ridge length per unit area or, in other words, the total ridge lengths per unit area of all of the decorative portions are the same.

Additionally, in the test examples, pneumatic tires of Working Examples 1 to 7 were evaluated as Working Examples. The pneumatic tire of Working Example 1 was provided with imaginary boundary lines (boundary lines) so as to form a lattice pattern. In other words, this pneumatic tire had a configuration in which both imaginary boundary lines extending in the tire circumferential direction and imaginary boundary lines extending in the tire radial direction were provided as the imaginary boundary lines, and the decorative portions were provided in the tire radial direction and the tire circumferential direction, respectively, of the decorative region. Moreover, two types of decorative portions were disposed in the decorative region so as to alternate in the tire radial direction (radial direction) and two types of decorative portions were disposed in the decorative region so as to alternate in the tire circumferential direction (circumferential direction). A difference in the ridge arrangement angles of contiguous decorative portions (difference between the ridge arrangement angle α of one decorative portion and the ridge arrangement angle α of a contiguous decorative portion) was 10°. The area of one of the decorative portions in the decorative region was 15.0 cm². In the decorative region, the ridges of the decorative portion and the ridges of the contiguous decorative portion were connected. Moreover, in the decorative region, there is no decorative portion with a different total ridge length per unit area or, in other words, the total ridge lengths per unit area of all of the decorative portions are the same.

Other than changing the difference in the ridge arrangement angles of contiguous decorative portions in the decorative region to 20°, the pneumatic tire of Working Example 2 had the same configuration as the pneumatic tire of Working Example 1. Other than randomly disposing three types of decorative portions in the decorative region in the tire radial direction (radial direction) and randomly disposing three types of decorative portions in the decorative region in the tire circumferential direction (circumferential direction), the pneumatic tire of Working Example 3 had the same configuration as the pneumatic tire of Working Example 2. Other than periodically disposing three types of decorative portions in the decorative region in the tire radial direction (radial direction) and periodically disposing three types of decorative portions in the decorative region in the tire circumferential direction (circumferential direction), the pneumatic tire of Working Example 4 had the same configuration as the pneumatic tire of Working Example 3. Other than configuring the area of one decorative portion to be 4.0 cm², the pneumatic tire of Working Example 5 had the same configuration as the pneumatic tire of Working Example 4. Other than being configured so as to include a decorative portion having a different total ridge length per unit area, the pneumatic tire of Working Example 6 had the same configuration as the pneumatic tire of Working Example 5. Other than being configured so that the ridges of one of the decorative portions were not connected to the ridges of a contiguous decorative portion, the pneumatic tire of Working Example 7 had the same configuration as the pneumatic tire of Working Example 6.

In these test examples, each of the pneumatic tires of the Conventional Example, Comparative Examples, and Working Examples was evaluated for the four criteria of appearance (of the carcass splice portion), appearance (of the carcass folded up portion), appearance (three-dimensional), and durability. Appearance (of the carcass splice portion) was visually evaluated for the degree to which the region corresponding to the carcass splice portion of the side wall portion stood out. The evaluation results were converted to index scores, with the index score for the Conventional Example being 100. Larger index scores indicate superior appearance of the side wall portion corresponding to the carcass splice portion. Appearance (of the carcass folded up portion) was visually evaluated for the degree to which the region corresponding to the carcass folded up portion of the side wall portion stood out. The evaluation results were converted to index scores, with the index score for the Conventional Example being 100. Larger index scores indi- cate superior appearance of the side wall portion corresponding to the carcass folded up portion. Appearance (three-dimensional) was visually evaluated for the degree to which a side ridge design appeared to be three-dimensional. The evaluation results were converted to index scores, with the index score for the Conventional Example being 100. Larger index scores indicate superior three-dimensional appearance. Here, "durability" refers to durability against cracking in the decorative region. In these test examples, cuts having a depth of 1.5 mm and a length of 5.0 mm were formed in recesses between ridges at four locations (at equal intervals) on the periphery of the tire. The pneumatic tires in which the cuts described above are formed were inflated to an air pressure of 120 kPa, and mounted on an internal drum tester. A load equivalent to 88% of a maximum load capacity of each tire was applied, and continued traveling was performed for 62 hours at a speed of 81 km/h. Following the traveling, each of the pneumatic tires was evaluated by measuring a growth ratio of the cuts. The evaluation results were converted to index scores, with the index score for the Conventional Example being 100. Larger index scores indicate superior durability, and specifically indicate that crack growth is suppressed. Note that in these performance tests, pneumatic tires scoring 104 or higher are considered to be superior, and pneumatic tires scoring in a range from 97 to 103 are considered to be equivalent. The results of testing the four criteria described above are shown in the following Tables 1 to 3.

TABLE 1

|  | Conventional Example | Comparative Example 1 | Comparative Example 2 |
|---|---|---|---|
| Disposal of boundary lines | — | Vertical striped pattern | Horizontal striped pattern |
| Difference in smallest ridge angles of contiguous regions | — | 20 | 20 |
| Number of types of ridge arrangement angles |  |  |  |
| Throughout | 1 | 2 | 2 |
| Radial direction | 1 | 1 | 2 |
| Circumferential direction | 1 | 2 | 1 |
| Arrangement of ridge angle disposal | — | Alternating | Alternating |
| Area of one decorative section (cm2) | — | 15 | — |
| Presence/absence of decorative portion with different total ridge length per unit area | Absent | Absent | Absent |
| Relationship of ridge end portions of contiguous sections | — | Disconnected | Disconnected |
| Appearance |  |  |  |
| Carcass splice portion | 100 | 102 | 100 |
| Carcass folded up portion | 100 | 100 | 102 |
| Three-dimensionality | 100 | 102 | 102 |
| Durability | 100 | 100 | 100 |

TABLE 2

|  | Working Example 1 | Working Example 2 | Working Example 3 | Working Example 4 |
|---|---|---|---|---|
| Disposal of boundary lines | Lattice-form | Lattice-form | Lattice-form | Lattice-form |
| Difference in smallest ridge angles of contiguous regions | 10 | 20 | 20 | 20 |
| Number of types of ridge arrangement angles |  |  |  |  |
| Throughout | 2 | 2 | 3 | 3 |
| Radial direction | 2 | 2 | 3 | 3 |
| Circumferential direction | 2 | 2 | 3 | 3 |
| Arrangement of ridge angle disposal | Alternating | Alternating | Random | Periodic |
| Area of one decorative section (cm2) | 15 | 15 | 15 | 15 |

TABLE 2-continued

|  | Working Example 1 | Working Example 2 | Working Example 3 | Working Example 4 |
|---|---|---|---|---|
| Presence/absence of decorative portion with different total ridge length per unit area | Absent | Absent | Absent | Absent |
| Relationship of ridge end portions of contiguous sections | Connected | Connected | Connected | Connected |
| Appearance |  |  |  |  |
| Carcass splice portion | 104 | 105 | 106 | 107 |
| Carcass folded up portion | 104 | 105 | 106 | 107 |
| Three-dimensionality | 104 | 105 | 106 | 107 |
| Durability | 100 | 100 | 100 | 100 |

TABLE 3

|  | Working Example 5 | Working Example 6 | Working Example 7 |
|---|---|---|---|
| Disposal of boundary lines | Lattice-form | Lattice-form | Lattice-form |
| Difference in smallest ridge angles of contiguous regions | 20 | 20 | 20 |
| Number of types of ridge arrangement angles |  |  |  |
| Throughout | 3 | 3 | 3 |
| Radial direction | 3 | 3 | 3 |
| Circumferential direction | 3 | 3 | 3 |
| Arrangement of ridge angle disposal | Periodic | Periodic | Periodic |
| Area of one decorative section (cm2) | 4 | 4 | 4 |
| Presence/absence of decorative portion with different total ridge length per unit area | Absent | Present | Present |
| Relationship of ridge end portions of contiguous sections | Connected | Connected | Disconnected |
| Appearance |  |  |  |
| Carcass splice portion | 108 | 110 | 110 |
| Carcass folded up portion | 108 | 110 | 110 |
| Three-dimensionality | 108 | 110 | 110 |
| Durability | 100 | 100 | 104 |

It is clear from Tables 1 to 3 that, compared to the Conventional Example and the Comparative Examples, the Working Examples were evaluated to be superior in terms of the each of the three appearance criteria. As described above, it is clear that the quality of the appearance of a tire can be enhanced while tire performance is maintained with the pneumatic tire of the present technology. Moreover, it is clear from the results of Working Examples 6 and 7 that durability can be enhanced by providing a form in which the ridges of contiguous decorative portions are disconnected.

What is claimed is:

1. A pneumatic tire comprising a tread portion, a side wall portion, and a bead portion, wherein
the side wall portion comprises, in a specific region in a tire radial direction, a toric decorative region;
the decorative region includes multiple convex ridges that are disposed on the outer surface of the side wall portion;
a ridge arrangement angle is defined as an angle formed by a line extended from the ridge and a line tangent at an inner ring of the toric decorative region;
an imaginary boundary line is defined by connecting end portions of the ridges having the same ridge arrangement angle, and being adjacent to each other, the end portions connected by the imaginary boundary lines are separated from each other, and not connected by another ridge;
a decorative portion is defined as a region partitioned by the imaginary boundary line;
pluralities of the decorative portions are arranged so as to be contiguous in a grid pattern composed of two or more columns and two or more rows, the columns and the rows extending in different directions on an outer surface of the side wall portion;
the ridge arrangement angles of the contiguous decorative portions differ from each other in the columns and the rows, respectively;

first and second of the imaginary boundary lines are parallel between the contiguous decorative portions;

a distance between the first and second of the imaginary boundary lines is less than 1 mm;

wherein the first imaginary boundary line overlaps with the second imaginary boundary line on a single imaginary line, or wherein the first imaginary boundary line overlaps with the ridges connecting by the second imaginary boundary line; and the decorative region includes not less than three types and not more than twelve types of the decorative portions having different ridge arrangement angles.

2. The pneumatic tire according to claim 1, wherein the first imaginary boundary line and the second imaginary boundary line are disposed periodically in the tire circumferential direction and the tire radial direction.

3. The pneumatic tire according to claim 1, wherein the ridge arrangement angle of the decorative portion is not less than 20° and not more than 160° different from the ridge arrangement angle of the contiguous decorative portion.

4. The pneumatic tire according to claim 1, wherein the decorative portions are disposed in the decorative region in the tire circumferential direction and/or the tire radial direction in a combination where the ridge arrangement angle varies periodically.

5. The pneumatic tire according to claim 1, wherein an area of a decorative portion is not less than 0.3 cm$^2$ and not more than 10.0 cm$^2$.

6. The pneumatic tire according to claim 1, wherein at least one of the decorative portions included in the decorative region has a ridge length per unit area different than the ridge length per unit area included in the decorative portions.

7. The pneumatic tire according to claim 1, wherein the contiguous decorative portions comprises not less than three of the decorative portions in each of the columns or rows.

8. The pneumatic tire according to claim 1, wherein an arrangement pitch of the ridges is not less than 0.5 mm and not more than 5.0 mm.

9. The pneumatic tire according to claim 1, wherein the decorative portions comprise at least one of a rectangular decorative portion, a pentagonal decorative portion, and a decorative portion that is partially curved so as to be contiguous around a triangular decorative portion.

10. The pneumatic tire according to claim 1, wherein the decorative portions are disposed in rows in the tire circumferential direction.

11. The pneumatic tire according to claim 1, wherein the decorative portions are disposed in rows in the tire radial direction.

12. The pneumatic tire according to claim 1, wherein the decorative portions are disposed in order of stepwise ascending or descending size of the ridge arrangement angle in three or more steps.

13. The pneumatic tire according to claim 1, wherein the decorative region is provided throughout all regions of the side wall portion of the tire.

14. The pneumatic tire according to claim 1, wherein the decorative region includes three or more decorative portions.

15. The pneumatic tire according to claim 1, wherein the decorative portions in the columns have a same tire circumferential position, and share the single imaginary boundary line in the tire radial direction.

16. The pneumatic tire according to claim 1, wherein the decorative portions in the rows have a same tire radial position, and share the single imaginary boundary line in the tire circumferential direction.

17. The pneumatic tire according to claim 1, wherein the decorative portions in the columns have a same tire circumferential position, and share the single imaginary boundary line in the tire radial direction; and the decorative portions in the rows have a same tire radial position, and share the single imaginary boundary line in the tire circumferential direction.

* * * * *